Figure 1:
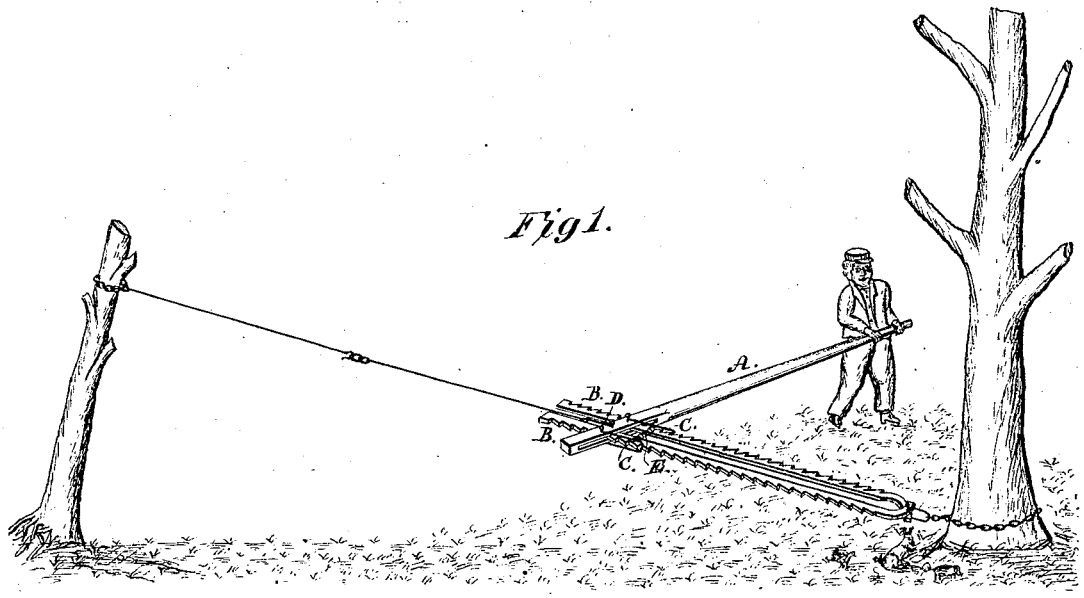
Figure 2:
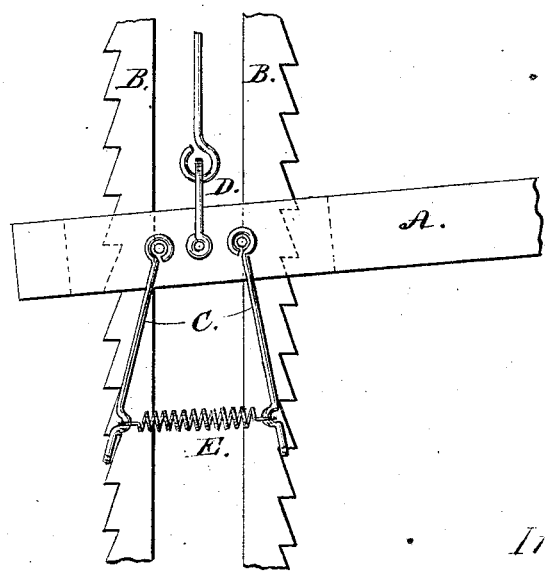

C. C. HOGUE.
Stump-Puller.

No. 159,760. Patented Feb. 16, 1875.

Witnesses:
C. C. Kelly
M. Walratt

Inventor:
C. C. Hogue.

THE GRAPHIC CO.PHOTO-LITH.39 & 41 PARK PLACE, N.Y.

UNITED STATES PATENT OFFICE.

CHARLES C. HOGUE, OF BRUSH CREEK, IOWA.

IMPROVEMENT IN STUMP-PULLERS.

Specification forming part of Letters Patent No. 159,760, dated February 16, 1875; application filed October 16, 1874.

*To all whom it may concern:*

Be it known that I, CHARLES C. HOGUE, of Brush Creek, Fayette county, State of Iowa, have invented a Stump or Tree Puller, of which the following is a specification:

The object of my invention is to extract stumps, and more particularly trees, by the combination, in a hand or horse double-acting lever-power, of the slotted lever A, double ratchet-bars B B, stirrups C C, and spring E, as shown in the drawing.

The machine is shown in plainer detail in the plan view of same drawing, in which the full length of lever is omitted as unnecessary.

The ratchet-bars B B are connected by a clevis, through which, and around a convenient tree, a chain is passed, for the purpose of anchoring the machine. The bars pass through the slot in the lever A, and are embraced by the stirrups C C. The lever is connected by a center clevis and connecting-rods with the object to be drawn.

By a horizontal movement back and forward a movement is given to the lever by the stirrups C C, which take up the ratchets alternately at each movement of lever A, one stirrup going back, while the other moves ahead, thus keeping a continuous motion toward the anchor, which draws the tree over and then out of the ground.

It is evident that the ratchet-bars B B may have the notched face turned in or out, at pleasure of maker.

I claim as my invention—

The combination, in a double-acting stump or tree puller, substantially as described, of a slotted lever, A, double ratchet-bar B B, with stirrups C C, closed by spring E.

C. C. HOGUE.

Witnesses:
 C. C. KELLY,
 M. WALRATH.